R. A. FESSENDEN.
METHOD OF DETERMINING FREQUENCY OF PERIODIC IMPULSES.
APPLICATION FILED JUNE 12, 1909.
1,022,584.
Patented Apr. 9, 1912.
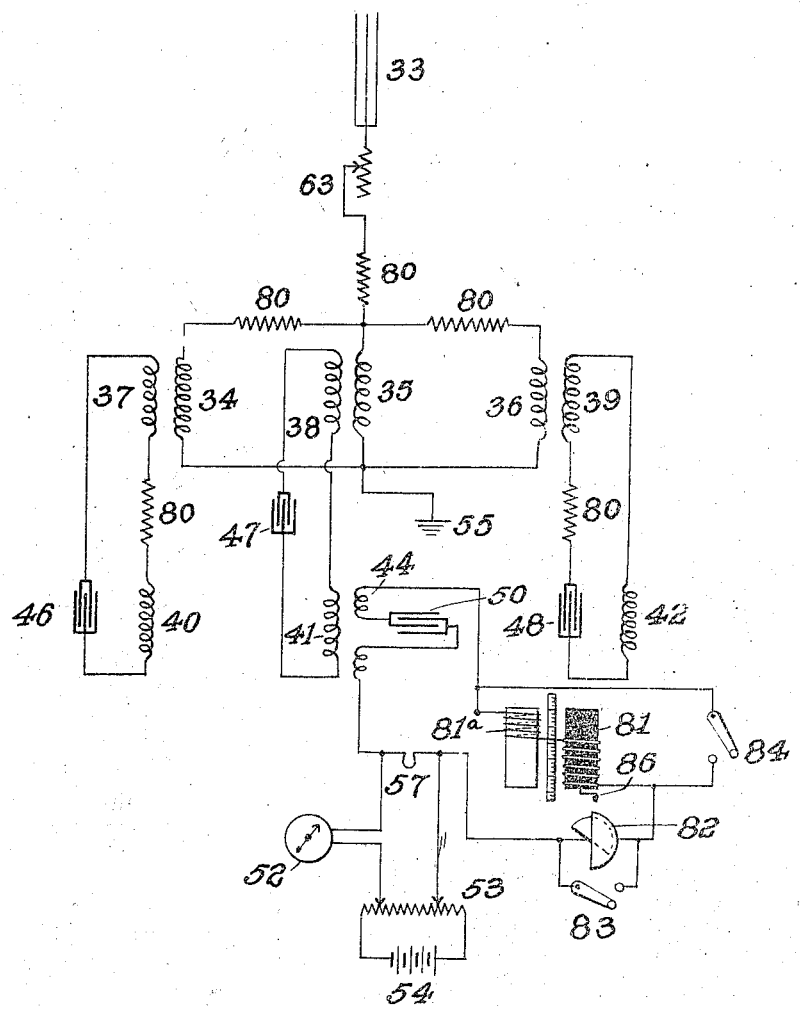

UNITED STATES PATENT OFFICE.

REGINALD A. FESSENDEN, OF BRANT ROCK, MASSACHUSETTS, ASSIGNOR TO NATIONAL ELECTRIC SIGNALING COMPANY OF PITTSBURGH, PENNSYLVANIA, A CORPORATION OF NEW JERSEY.

METHOD OF DETERMINING FREQUENCY OF PERIODIC IMPULSES.

1,022,584.      Specification of Letters Patent.      Patented Apr. 9, 1912.

Original application filed July 8, 1903, Serial No. 164,738. Divided and this application filed June 12, 1909. Serial No. 501,717.

*To all whom it may concern:*

Be it known that I, REGINALD A. FESSENDEN, a citizen of the United States, residing at Brant Rock, Plymouth county, State of Massachusetts, have invented a certain new and useful Method of Determining Frequency of Periodic Impulses, of which the following is a specification.

My invention relates to the measurement of the electrical constants of electric circuits and more particularly to electro-magnetic wave measurements, this application being a division of my application No. 164,738, filed July 8th, 1903.

The accompanying drawing forming a part of this specification shows in diagram an arrangement suitable for carrying out the invention.

The invention has for its object the measurement of the electric constants of electrical apparatus and electrical circuits. It is especially applicable to the measurement of the frequency of electromagnetic waves and the capacities and inductances of the various elements of circuits through which highly oscillatory currents are flowing.

In the practice of my invention I cause a tuned circuit containing an indicating device to be affected by oscillations from another circuit, and determine the quantities which it is desired to measure by adjusting one or more of the elements of the circuit containing the indicator.

In the figure, 33 is an antenna connected through the primaries 34, 35, 36 to the ground 55.

37, 40, 46; 38, 41, 47; 39, 42, 48 are circuits operatively connected to the primaries 34, 35, 36 respectively.

The circuit 44, 50, 57, 82, 81 is placed in inductive relation to the circuit which it is desired to measure, 44 being an inductance, 50 a capacity, 81 a variable inductance, 82 a variable condenser, 57 a receiver, preferably of the current operated type, 53 a potentiometer, 54 a battery, 52 an indicating instrument.

For tuning conductors I prefer to use the hot wire receiver described in U. S. Patent No. 706,742, shown at 57, and to use in connection therewith a variable inductance shown at 81 consisting of two cylinders one of hard rubber and the other, 81ª, of electrolytic copper. The cylinder of electrolytic copper 81ª acts as a closed secondary and neutralizes the self-induction of all the wire wound upon it. Hence, any desired self-induction may be obtained and may be varied continuously by turning the handle 86 instead of step by step. This form of inductance I have found very essential for obtaining good results in tuning and by its means it is possible to measure the inductance or capacity of a few inches of wire. It is preferred to use a galvanometer shown at 52 as the indicating instrument while tuning instead of a telephone. A variable capacity 82 may also be used in conjunction with an inductance, such as 44, by opening the switch 83 and closing the switch 84, and in some respects is preferable to it as the capacity of the varying inductance also varies somewhat with the inductance while the inductance of the varying capacity is practically constant.

In order to determine the tune of a circuit correctly, for example the circuit, 38, 41, 47 it is found advisable to insert dampening resistances shown at 80, 80, 80 in all circuits except the one which it is desired to measure, i. e., except in 38, 41, 47 as otherwise the oscillations set up in the other circuits will affect the periodicity of the one being measured.

In the practice of my invention the galvanometer 52 gives a maximum indication when the circuit 44, 50, 57, 82, 81 has the same frequency as that of the circuit 38, 41, 47 and the inductances and capacities of this circuit being known the frequency of the circuit 38, 41, 47 is thus determined. It is preferred to have a separate tuning coil capable of being varied in series with the vertical at the point 63.

Having thus described my invention and illustrated its use, what I claim as new and desire to secure by Letters Patent, is the following:

The method of determining the period of one of several associated oscillating circuits, which consists in dampening the oscillations in all but one of said circuits and bringing into resonance with that one an inductively connected auxiliary circuit having electrical constants variable in known degree, whereby the auxiliary circuit is by known adjustment brought to the same known periodicity as the circuit to be measured.

In testimony whereof I have hereunder signed my name in the presence of the two subscribed witnesses.

REGINALD A. FESSENDEN.

Witnesses:
JESSIE E. BENT,
FLORENCE M. LYON.